United States Patent
Frenkel et al.

(10) Patent No.: US 11,401,428 B2
(45) Date of Patent: Aug. 2, 2022

(54) COATING AGENT COMPOSITIONS THAT ARE SUITABLE FOR DIP COATING AND THAT CURE AT LOW TEMPERATURE

(71) Applicant: Chemetall GmbH, Frankfurt (DE)

(72) Inventors: Aliaksandr Frenkel, Frankfurt am Main (DE); Ron Eilinghoff, Frankfurt am Main (DE); Martin Droll, Paderborn (DE)

(73) Assignee: Chemetall GmbH, Frankfurt (DE)

( * ) Notice: Subject to any disclaimer, the term of this patent is extended or adjusted under 35 U.S.C. 154(b) by 248 days.

(21) Appl. No.: 16/633,694

(22) PCT Filed: Jul. 20, 2018

(86) PCT No.: PCT/EP2018/069840
§ 371 (c)(1),
(2) Date: Jan. 24, 2020

(87) PCT Pub. No.: WO2019/020534
PCT Pub. Date: Jan. 31, 2019

(65) Prior Publication Data
US 2020/0207995 A1    Jul. 2, 2020

(30) Foreign Application Priority Data

Jul. 26, 2017 (EP) .................... 17183267
Aug. 4, 2017 (EP) .................... 17184875
Mar. 29, 2018 (EP) .................... 18165185

(51) Int. Cl.
| | | |
|---|---|---|
| C09D 7/65 | (2018.01) | |
| C09D 7/40 | (2018.01) | |
| C09D 7/63 | (2018.01) | |
| B05D 1/18 | (2006.01) | |
| B05D 3/00 | (2006.01) | |
| B05D 7/00 | (2006.01) | |
| C08G 18/08 | (2006.01) | |
| C08G 18/28 | (2006.01) | |
| C08G 18/64 | (2006.01) | |
| C08G 18/80 | (2006.01) | |
| C09D 5/08 | (2006.01) | |
| C09D 175/04 | (2006.01) | |

(52) U.S. Cl.
CPC .............. C09D 7/65 (2018.01); B05D 1/18 (2013.01); B05D 3/002 (2013.01); B05D 3/007 (2013.01); B05D 7/542 (2013.01); C08G 18/0804 (2013.01); C08G 18/289 (2013.01); C08G 18/6484 (2013.01); C08G 18/8077 (2013.01); C09D 5/082 (2013.01); C09D 7/63 (2018.01); C09D 7/67 (2018.01); C09D 7/68 (2018.01); C09D 175/04 (2013.01); B05D 2350/60 (2013.01)

(58) Field of Classification Search
CPC ... C09D 7/65; C09D 7/67; C09D 7/68; C09D 7/63; C09D 5/082; C09D 175/04; B05D 1/18; B05D 3/002; B05D 3/007; B05D 7/542; B05D 2350/60; C08G 18/0804; C08G 18/6484; C08G 18/289; C08G 18/8077
See application file for complete search history.

(56) References Cited

U.S. PATENT DOCUMENTS

| | | | |
|---|---|---|---|
| 2011/0086173 A1 | 4/2011 | Walter et al. | |
| 2013/0177768 A1* | 7/2013 | Kruger | ............... C09D 175/04 428/412 |
| 2015/0322288 A1* | 11/2015 | Wasserfallen | ....... C09D 105/00 427/386 |
| 2017/0066009 A1 | 3/2017 | Bremser et al. | |
| 2017/0081542 A1* | 3/2017 | Bremser | ............... C09D 5/084 |
| 2017/0327700 A1 | 11/2017 | Jeromenok et al. | |

FOREIGN PATENT DOCUMENTS

| | | |
|---|---|---|
| CN | 106280946 A | 1/2017 |
| DE | 102008043682 A1 | 5/2010 |
| DE | 102015203507 A1 | 8/2015 |
| EP | 3029129 A1 | 6/2016 |
| RU | 2357003 C2 | 5/2009 |
| WO | 2015128449 A1 | 9/2015 |
| WO | 2017/117169 A1 | 7/2017 |

OTHER PUBLICATIONS

International Search Report for International Application No. PCT/EP2018/069840, dated Oct. 30, 2018, 5 pages.

* cited by examiner

*Primary Examiner* — Robert S Walters, Jr.
(74) *Attorney, Agent, or Firm* — Armstrong Teasdale LLP

(57) ABSTRACT

Aqueous coating compositions are provided. The aqueous compositions include at least one type of organic polymer particles having an average particle size of 10 to 1000 nm, including isocyanate-reactive polymers (A), one or more ketoxime- and/or pyrazole-blocked polyisocyanates (B) including at least one aromatic hydrocarbyl radical or at least one cycloaliphatic hydrocarbyl radical, at least one polyanionic polymer (C), at least one complex fluoride (D) selected from the group consisting of hexa- or tetrafluorides of metallic elements of groups IVb, Vb and VIb of the Periodic Table of the Elements, and at least one aminosilane (E), wherein the aqueous coating compositions have a pH of 3 to 5, and have a total solids content of 5% to 35% by weight. Also provided are processes for producing these aqueous coating compositions, processes for coating metal ion-releasing surfaces with the aqueous coating compositions, and coatings obtained therefrom.

15 Claims, No Drawings

COATING AGENT COMPOSITIONS THAT ARE SUITABLE FOR DIP COATING AND THAT CURE AT LOW TEMPERATURE

CROSS-REFERENCE TO RELATED APPLICATIONS

This application is a U.S. National Phase Application of PCT/EP2018/069840, filed Jul. 20, 2018, which claims the benefit of priority to EP Application No. 17183267.8, filed Jul. 26, 2017, EP Application No. 17184875.7, filed Aug. 4, 2017, and EP Application No. 18165185.2, filed Mar. 29, 2018, the contents of which are hereby expressly incorporated by reference in their entirety.

The invention relates to coating compositions that cure at low temperatures for coating of surfaces, especially by the dip coating method, to an electroless method of application and curing thereof, and to a corresponding coating produced from the coating composition.

There exist numerous methods of generating homogeneous coatings on metallic surfaces in particular by means of dipping methods. For the production of anticorrosion coatings in particular (consisting predominantly of an organic matrix and/or organic and/or inorganic additional components), preference is given here to utilizing the methods described hereinafter.

The conventional methods are based on utilization of the rheological properties of the formulations used in order to achieve complete coating of a joined workpiece. Even though it is possible by continuous rotating of the workpiece in question after the dipping operation to reduce accumulation of coating material at critical sites, it is not possible by this method to achieve a completely homogeneous coating. In addition, defects such as blister formation and pops can arise at sites with higher coating contents during the drying and/or crosslinking operation, and these impair the quality of the overall coating.

The electrophoretic methods avoid these problems by using electrical current in order to deposit a homogeneous coating by a dip coating method. By this method, it is possible to generate homogeneous coatings on metallic workpieces. The coatings deposited show extremely good adhesion in the wet state to the metallic substrate. Without detachment of the coating, it is possible to treat the workpiece in a subsequent rinsing step. The effect of this is that the aforementioned sites on the workpiece that are difficult to access are freed of excess coating solution and hence no defects can arise during the drying operation. This technique has the disadvantage that, in addition to the amount of electrical energy and in addition to the special dip baths necessary, which lead to an increase in costs, what are called edge runs also occur since electrical fields are built up inhomogeneously at macroscopic edges, and the edges are coated in a nonuniform and possibly even incomplete manner. In the construction of the workpieces, it is additionally necessary to avoid cavities since an effect comparable to the phenomenon of the Faraday cage occurs at these sites. Owing to the reduction in the electrical field strengths needed for deposition, only significantly reduced coating, if any, can be applied by the method in such regions on the workpiece (wraparound problems), which leads to impairment of the coating quality. In addition, electrocoating (ETL), for example cathodic electrocoating (KTL), has the disadvantages cited hereinafter. For instance, a corresponding dip bath together with all the electrical and mechanical devices from temperature control, power supply and electrical insulation, the necessary circulation devices and addition devices, up to the disposal of the anolyte acid formed in the electrolytic coating and an ultrafiltration for paint recycling, and also control devices, is of very complex construction. The process regime entails very high technical complexity owing to the high currents and amounts of energy as well, and in the homogenization of the electrical parameters over the bath volume and in the precise setting of all process parameters, and also in the maintenance and cleaning of the plant.

By contrast, the conventional autophoretic methods are based on an electroless concept consisting of a pickling attack on the substrate surface used, in which metal ions are leached away from the surface and an emulsion coagulates owing to the concentration of metallic ions at the resultant interface. Even though these methods do not have the abovementioned restrictions of the electrolytic methods with regard to the Faraday cage effect, the coatings formed in the process must be fixed in a complex multistage dipping method after the first activation step. Furthermore, the pickling attack leads to unavoidable contamination of the active zone by metal ions that have to be removed from the zones. Moreover, the method is based on a chemical deposition process which is not self-regulating and cannot be stopped if required, as is possible, for example, as a result of the switching-off of an electrical current in the electrolytic methods. Thus, in the case of a prolonged dwell time of the metal substrates in the active zones, the formation of an excessively high layer thickness is unavoidable.

WO 2017/117169 A1 describes low-temperature-curing, self-depositing coating compositions curable using blocked polyisocyanates. However, these coating compositions are incapable of forming ionogenic gels in use, such that both the deposition mechanism and the coating composition layer applied are fundamentally different than the present invention.

It was an object of the present invention to provide an aqueous coating composition which is storage-stable, easily producible and electrolessly depositable on metal ion-releasing surfaces, and at the same time forms homogeneous, very substantially complete and essentially flat coatings in relatively high layer thickness and especially does not have the above-addressed disadvantages of the prior art. The aqueous coating composition was additionally to be thermally curable and, even without catalysts for the isocyanate crosslinking reactions, especially without metal-containing catalysts for the isocyanate crosslinking reactions, at very low baking temperatures (<200° C., 30 min), was to provide coatings having high corrosion resistance, especially low undermining in the salt spray test. A further object was that of providing a process for coating metal ion-releasing surfaces of substrates using the coating compositions of the invention.

The object of the invention was achieved by providing an aqueous coating composition comprising
  at least one type of organic polymer particles having an average particle size of 10 to 1000 nm, comprising isocyanate-reactive polymers (A), preferably consisting of isocyanate-reactive polymers (A),
  one or more ketoxime- and/or pyrazole-blocked polyisocyanates (B), comprising at least one aromatic hydrocarbyl radical or at least one cycloaliphatic hydrocarbyl radical,
  at least one polyanionic polymer (C),
  at least one complex fluoride (D) selected from the group consisting of hexa- or tetrafluorides of the metallic elements of groups IVb, Vb and VIb of the Periodic Table of the Elements, and at least one aminosilane (E) comprising a silyl group of the formula $Si(OR^7)_{3-i}(R^8)_i$, in which $R^7$ is an alkyl radical having 1 to 4 carbon atoms or is an O=C—CH$_3$ group, $R^8$ is an alkyl radical having 1 to 4 carbon atoms and i is 0 or 1, wherein the aqueous coating composition has a pH of 3 to 5, preferably 3.5 to 4.5, more preferably 3.8 to 4.2, and has a total solids content (according to DIN ISO 3251, 1 g sample, 60 min, 125° C.) of 5% to 35% by weight, preferably 10% to 30% by weight, more preferably 15% to 25% by weight.

The aqueous coating composition of the invention is used in step II and optionally also step V of the coating process of the invention detailed hereinafter.

The coating process of the invention is a process for coating the metal ion-releasing surface of a substrate, comprising or consisting of the following steps:

I. providing a substrate having a metal ion-releasing surface,
II. contacting the metal ion-releasing surface with an aqueous coating composition of the invention to form an organic coating,
III. optionally rinsing the organic coating and
IV. optionally drying the organic coating at a temperature of 10 to 120° C. within a period of 1 to 40 min; and curing the organic coating at a peak metal temperature of 120 to 200° C. within a period of 5 to 50 min; or
V. optionally drying the organic coating and coating with a further coating composition of the invention and then drying the coating formed in step V or both coatings and curing the two coatings together at a peak metal temperature of 120 to 200° C. within a period of 5 to 50 min.

The coating composition of the invention is capable of forming an ionogenic gel in step II on the metal ion-releasing surface of the substrate.

Ionogenic gels in the context of this invention are described, for example, by Braccini and Pérez in *Biomacromolecules* 2001, 2, 1089-1096 or Siew and Williams in *Biomacromolecules* 2005, 6, 963-969. The ionogenic gels detailed in the two aforementioned publications are those based on polyanionic polymers (C), especially of the naturally occurring anionic polysaccharides of the pectin and alginate type and of synthetic polyacrylic acid. The polyanionic polymers (C) form said ionogenic gels in an aqueous medium in the presence of polyvalent metal cations.

The ionogenic gels of the present invention generally comprise, as well as the metal ions released from the surface of the substrate, all constituents of the coating composition of the invention.

It has been found that, surprisingly, the substrates having metal ion-releasing surfaces, on treatment with the aqueous coating composition of the invention, form a coating based on an ionogenic gel, and that the ionogenic gel layer deposited on the substrate permits the through-diffusion of further cations leached out of the metal ion-releasing surface, such that coating with further coating compositions of the invention can be effected in further coating baths/stages in step V.

The dried and/or cured coatings obtained in step V can be recoated with conventional basecoats and/or clearcoats.

Since the coating process of the invention leads in accordance with the invention to homogeneous, very substantially complete coatings, the last coating in each case in the process outlined above must be rinse-resistant. The term "rinse-resistant" in the context of this invention means that, under the conditions of industrial manufacture, the coating is essentially conserved by a customary industrial rinse operation, so as to result in a complete coating.

There follows a more detailed description of the constituents, especially the preferred constituents, of the coating compositions of the invention, the particularly suitable substrates and their possible pretreatment, and the execution of the process of the invention.

Organic Polymer Particles Comprising Isocyanate-Reactive Polymers (A)

The aqueous coating composition of the invention comprises organic polymer particles comprising polymers (A) reactive toward isocyanate groups, isocyanate-reactive polymers (A) for short. The isocyanate-reactive polymers (A) are the main film formers alongside their coreactants, the ketoxime- and/or pyrazole-blocked polyisocyanates (B), and the polyanionic polymers (C).

Reactivity toward isocyanate groups and hence at higher temperatures, including toward blocked isocyanate groups, results from the presence of isocyanate-reactive groups in these polymers. The groups reactive toward isocyanate groups include especially hydroxyl groups, primary and secondary amino groups, and carboxyl groups, carboxamide groups or thiol groups, among which particular preference is given to hydroxyl groups.

Organic polymer particles comprising one or more isocyanate-reactive polymers (A) are preferably those in the form of a primary dispersion. However, the dispersions of the organic primary particles may in principle also be obtained as secondary dispersions.

The term dispersion herein encompasses the terms suspension and emulsion.

Primary dispersions are generally obtained by emulsion polymerization, whereas, in secondary dispersions, monomers are dissolved in an organic solvent, polymerization is effected in the organic solvent, the solvent is removed and the polymer is emulsified into an aqueous phase.

The average particle size (Z-average) of the organic polymer particles is in the range from 10 to 1000 nm, preferably in the range from 50 to 900 nm and most preferably in the range from 400 to 800 nm, measured by means of dynamic light scattering using a Malvern Zetasizer (Software v7.02) from Malvern (Herrenberg, Germany).

The polymers (A) reactive toward isocyanate groups (isocyanate-reactive polymers (A) for short) are preferably selected from the group of the polyacrylates, polyurethanes and polyepoxides, and hybrid systems comprising two or more of these polymers.

Stabilized organic polymer particles are more preferably selected such that the isocyanate-reactive polymer (A) present is selected from the group consisting of nonionically stabilized polyepoxy dispersions, nonionically stabilized polyurethane dispersions and nonionically stabilized polyacrylate dispersions, or the hybrid systems that result therefrom.

Hybrid systems may be subdivided by type into three groups of hybrid systems:

a. hybrid systems that are generated by mere mixing of the different dispersions,
b. hybrid systems having a chemical bond between the different types of polymer; and
c. hybrid systems in which the different types of polymer form interpenetrating networks (IPNs).

Typical hybrid systems covered by the above types are, for example, polyacrylate-polyurethane hybrid dispersions.

Typically, such polyacrylate-polyurethane hybrid dispersions are produced by emulsion polymerization of one or more (meth)acrylic and/or vinylic monomers in an aqueous polyurethane dispersion. Alternatively, it is possible to produce the polyacrylate-polyurethane hybrid dispersion as a secondary dispersion.

The term (meth)acrylic includes the terms acrylic and methacrylic. A (meth)acrylic monomer may therefore bear an acryloyl group or a methacryloyl group. The term vinylic includes all polymerizable monomers that bear a vinyl group but are not covered by the term (meth)acrylic.

Aqueous polyacrylate-polyepoxide hybrid dispersions are typically prepared by addition reactions of a bifunctional epoxide with bifunctional amine monomer units and subsequent reaction with a polyacrylate having sufficient carboxyl functions. Water dispersibility can be achieved, for example, by carboxylate groups that have been converted to anionic groups with amines and subsequent dispersion in water.

The organic polymer particles comprising one or more isocyanate-reactive polymers (A) may be in anionically stabilized, nonionically stabilized or simultaneously anionically and nonionically stabilized form. The stabilization is typically effected by means of emulsifiers.

A distinction is made between external emulsifiers and internal emulsifiers. External emulsifiers, by contrast with internal emulsifiers, are not part of the polymer structure but independent species. In the context of this invention, external emulsifiers are among the additives (G) described further down.

Stabilization with external emulsifiers can be effected, for example, by means of anionic emulsifiers even in the course of emulsion polymerization. Typical anionic emulsifiers are sulfated or sulfonated anionic emulsifiers, preferably of the following structures: $R^t$—$(OCH_2CH_2)_a$—$(O)_b$—$SO_3^-M^+$ with $R^t$=alkyl or aryl, a=8 to 30, b=0 or 1 and $M^+$=alkali metal cation or $NH_4^+$.

The sheathing of the organic particles with the anionic emulsifier molecules results in a negative charge on the surface thereof, which leads to electrostatic repulsion of the organic polymer particles.

However, external stabilization can also be effected by nonionic emulsifiers. Typical nonionic emulsifiers preferably have the following structures: $R^t$—$(OCH_2CH_2)_a$—$OH$ with $R^t$=alkyl or aryl, and a=8 to 50. By contrast with the electrostatic repulsion of the dispersions produced with anionic emulsifiers, the stabilization mechanism of nonionic emulsifiers is based on steric effects.

Internal anionic emulsifiers—i.e. emulsifiers incorporated into the isocyanate-reactive polymer (A)—generally have sulfate groups, sulfonate groups or carboxylate groups and have at least one functional group that can react with functional groups of the other polymer constituents.

For example, the compound bearing a sulfonate group of the formula $H_2N$—$CH_2$—$CH_2$—$NH$—$(CH_2)_x$—$SO_3Na$ with x=2 or 3 can especially be reacted and incorporated into the polymer via the primary amino group, but in principle also via the secondary amino group, with isocyanates in the formation of polyurethanes or with oxirane groups in the formation of polyepoxides.

A typical representative of the carboxylate group type is, for example, dimethylolpropanoic acid or the salt form thereof, which is incorporable into polyurethanes via the hydroxyl groups by reaction with isocyanate groups or into polyepoxides by reaction with oxirane groups.

Internal nonionic emulsifiers generally have hydrophilic polyalkylene oxide chains. Particularly suitable internal nonionic emulsifiers comprise or consist of polyethylene oxide chains or poly(ethylene oxide-propylene oxide) chains, where the molar propylene oxide content in the case of the latter is preferably lower than that of ethylene oxide, in order to assure sufficient hydrophilicity. The polyalkylene oxide chains may be incorporated either into the main chain of the polymer backbone or as a side chain or terminally.

Such polyalkylene oxide chains are appropriately incorporated as internal nonionic emulsifiers into the isocyanate-reactive polymers (A) by the reaction between reactive functional groups on the polymer to be stabilized and functional groups of the species comprising the polyalkylene oxide chain(s) that are reactive toward the reactive groups in the polymer.

The polymer to be internally stabilized nonionically is preferably selected from the group consisting of polyacrylates, polyurethanes, polyepoxides, urethane acrylates, aromatic and (cyclo)aliphatic epoxy acrylates and polyesters, and the mixture thereof. In the polyurethanes and urethane acrylates, the polyalkylene oxide chain(s) is/are preferably attached via free isocyanate groups that are still present in the polyurethane or urethane acrylate to hydroxyl groups or amino groups, preferably exactly one hydroxyl group or one amino group of the species comprising polyalkylene oxide chain(s).

In the context of the present invention, reactive functional groups on the polymer to be stabilized nonionically are especially understood to mean isocyanate groups, hydroxyl groups, carboxyl groups, oxirane groups, vinyl groups and amino groups.

A typical and preferred attachment reaction in which the species comprising polyalkylene oxide chain(s) can be attached to the polymer to be stabilized is urethane formation between a hydroxyl group and an isocyanate group. Depending on the viscosity, the reaction may preferably be undertaken in the presence of organic solvents that are subsequently removed again. For example, an isocyanate-functionalized polyethylene glycol molecule may be used as species comprising a polyalkylene oxide chain and a polyester polyol as polymer to be stabilized nonionically, preferably having a number-average molecular weight $M_n$ in the range from 1000 to 3000 g/mol. In that case, hydroxyl groups are present as reactive groups on the original binder that are capable of forming urethane bonds. Advantageously, the polyester polyol used has reactive groups in the range from 100 g/eq to 5000 g/eq.

Advantageously, the species comprising one or more polyalkylene oxide chains is an oligomer of ethylene glycol units that has been provided with a terminal hydrocarbyl group, where the number of ethylene glycol units in the oligomer is preferably 2 to 20, more preferably 5 to 10, and the oligomer has a group reactive toward the polymer to be stabilized nonionically, preferably a hydroxyl group or amino group.

More preferably, the species comprising one or more polyalkylene oxide chains has a number-average molecular weight $M_n$ determined by means of gel permeation chromatography (in THF at 25° C. using a polystyrene standard) between 300 and 1000 g/mol. Most preferably, the species comprising one or more polyalkylene oxide chains has, as terminal hydrocarbyl group, an alkyl group having 1 to 4 carbon atoms or an aryl group having 6 to 12 carbon atoms.

The internally nonionically stabilized isocyanate-reactive polymer (A) is prepared via covalent attachment of the species comprising one or more polyalkylene oxide chains to the aforementioned polymer. The nonionically stabilized isocyanate-reactive polymer (A) thus produced forms a stable dispersion in aqueous phases, preferably over a period of at least 6 to 12 months.

In a further variant, the species comprising a polyalkylene oxide chain is an oligomer of ethylene glycol units, where the number of ethylene glycol units in the oligomer is preferably 2 to 20, more preferably 5 to 10, and the oligomer has a group reactive toward the polymer to be stabilized nonionically, preferably a hydroxyl group or amino group, and at least one further terminal reactive group, for example a hydroxyl group, an amino group, vinyl group, acryloyl group or methacryloyl group. These groups may contribute to crosslinking either via free-radical reaction or via addition or condensation reactions during the baking process. This can produce a crosslinked, complete coating which is stable toward water, chemicals and corrosion and shows improved scratch resistance and pencil hardness, high flexibility, extensibility and cold formability, and good adhesion.

The organic polymer particles comprising one or more isocyanate-reactive polymers (A) may additionally advantageously be surface-modified by silanes, especially the aminosilanes (E) described further down, and/or by phosphorus group-containing and/or amine-containing organic species or phosphates. Such species may be bound to the organic polymer particles covalent or by physisorption or chemisorption, and may have functional groups for attachment to the substrate surface to be treated. Organic particles lacking or having inappropriate reactive groups for attachment to their surfaces may be bound to the surface to be coated by adsorption of the internally stabilizing emulsifier radicals, especially of the polyethylene glycol sections.

The stabilized isocyanate-reactive polymers (A) have additional emulsifying properties and can thus facilitate the ionogenic deposition of other binders and particles.

In principle, it is possible to combine nonionic stabilization with anionic stabilization and/or external stabilization with internal stabilization.

Particular preference is given to nonionically stabilized polyepoxy dispersions, especially those comprising one or more polyethylene oxide radicals.

Typically, the coating is formed exclusively or virtually exclusively via ionogenic gel formation as described at the outset, such that autophoretic processes take place only to an extremely minor degree, if at all. By the test described in the paragraph that follows, it is possible in a simple manner to find coating compositions of very particularly good suitability where barely any or no autophoresis takes place.

Stabilized organic polymer particles usable with very particular preference, comprising one or more isocyanate-reactive polymers (A), are accordingly those that can be selected by the test described hereinafter:
1) creating an aqueous mixture from demineralized water, 0.5% by weight of a polyanionic polymer (C) described in detail below, and 10% by weight of the nonionically stabilized dispersion to be examined;
2) adjusting the mixture to a pH of 2 to 3 with the aid of hexafluorozirconic acid;
3) dipping a cleaned substrate into the above-described solution at room temperature (i.e. 23° C.) for 5 minutes;
4) in the case of deposition, conducting a comparative test (without polyanionic polymer (C)), for which purpose a mixture of demineralized water and 10% by weight of the nonionically stabilized dispersion to be examined is prepared;
5) adjusting the mixture prepared under 4) back to a pH of 2 to 3 by means of hexafluorozirconic acid and
6) repeating the test described under 3).

If 3) results in organic deposition on the substrate and 6) without polyanionic polymer (C) does not result in deposition, the stabilized organic polymer particles comprising one or more isocyanate-reactive polymers (A) are of very particularly good suitability for the process of the invention.

The content of the organic polymer particles comprising isocyanate-reactive polymers (A), based on the total weight of the aqueous coating composition, is preferably 3% to 25% by weight, more preferably 8% to 20% by weight, even more preferably 10% to 18% by weight, especially 11% to 17% by weight. The content of organic polymer particles is determined on the dispersion of the organic polymer particles prior to introduction thereof into the aqueous coating composition of the invention in accordance with DIN ISO 3251 (1 g of sample, 60 min, 125° C.) and then expressed relative to the total weight of the aqueous coating composition.

Ketoxime- and/or Pyrazole-Blocked Polyisocyanates (B)

In the context of the present invention, the term blocked polyisocyanates is understood to mean those polyisocyanates that have at least two blocked isocyanate groups.

A blocked isocyanate group is understood to mean an isocyanate group that has been blocked or capped by addition reaction onto what is called a blocking agent and wherein the addition reaction is reversible at higher temperatures, optionally using suitable catalysts.

Blocked polyisocyanates in the context of this invention—and as is customary in the field of coating compositions—do not comprise any free isocyanate groups and should thus be regarded, as far as technically possible, as 100% blocked polyisocyanates.

In the context of this invention, the polyisocyanates (B) are blocked by ketoximes and/or pyrazoles, especially by ketoximes or pyrazoles.

However, the structures formed by reaction of NCO groups with one another, even if they can be retroformed reversibly, for example by means of heat, to give NCO groups, are not considered to be blocked isocyanate groups in the context of this invention. For example, a uretdione group formed from two NCO groups is not regarded herein as the mutual blocking of two NCO groups. The same is also true of the isocyanurate groups, iminooxadiazinedione groups, allophanate groups and biuret groups, although they are more stable, if they can be retroformed at all to give free NCO groups.

Polyisocyanates

The free polyisocyanates used for preparation of the blocked polyisocyanates for use in accordance with the invention can be described by the following general formula (I):

$$R^1\text{---}[NCO]_n \qquad (I)$$

in which
$R^1$ is an organic radical free of organic NCO groups and comprising at least one aromatic hydrocarbyl radical or at least one cycloaliphatic hydrocarbyl radical and optionally one or more groups selected from the group consisting of isocyanurate groups, iminooxadiazinedione groups, uretdione groups, allophanate groups, biuret groups, urethane groups, urea groups, ether groups and ester groups; and
n is 2 to preferably 10, preferably 3 to 8, more preferably 3 to 6.

The polyisocyanates of the formula (I) may be aromatic or cycloaliphatic polyisocyanates.

In the case of the aromatic polyisocyanates, the $R^1$ radical comprises at least one aromatic hydrocarbyl radical. This is preferably a substituted or unsubstituted six-membered aromatic hydrocarbon ring. Suitable substituents on the six-membered aromatic hydrocarbon ring are especially alkyl groups having 1 to 3 carbon atoms.

In the aromatic polyisocyanates, preferably at least one of the n isocyanate groups of formula (I) is bonded to the aromatic hydrocarbyl radical. More preferably, all n isocyanate groups of formula (I) are preferably bonded to the aromatic hydrocarbyl radical.

Typical species of the formula (I) that are preferred in the context of the present invention comprise tolylene diisocyanate-based hydrocarbyl radicals and/or diphenylmethane diisocyanate-based hydrocarbyl radicals in the $R^1$ radical, preferably diphenylmethane diisocyanate (MDI)-based hydrocarbyl radicals.

The term tolylene diisocyanate (TDI) herein embraces 2,4-TDI and 2,6-TDI and the isomer mixture thereof. The term diphenylmethane diisocyanate (MDI) herein embraces 4,4'-MDI, 2,4'-MDI, 2,2'-MDI, and what is called technical grade diphenylmethane diisocyanate (frequently also wrongly called polymeric MDI). Technical grade MDI can be represented by the general structure

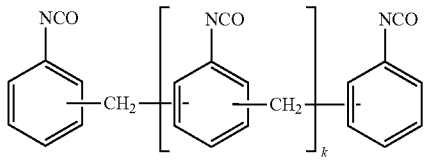

in which k is preferably 0 to 10. Technical grade MDI is a mixture of species of the aforementioned formula, where preferably 30% to 80% by weight is accounted for by a species with k=0 and less than 15% by weight by species with k≥6, based in each case on the total weight of the technical grade MDI.

Where reference is made here generally to isocyanate-based hydrocarbyl radicals, what is meant thereby is the radical of an isocyanate or polyisocyanate that remains when the isocyanate or polyisocyanate is "freed" of its isocyanate groups. For example, a tolylene radical is a tolylene diisocyanate-based hydrocarbyl radical.

In the case of the cycloaliphatic polyisocyanates, the $R^1$ radical comprises at least one cycloaliphatic hydrocarbyl radical. This is preferably a substituted or unsubstituted six-membered cycloaliphatic hydrocarbon ring. Suitable substituents on the six-membered cycloaliphatic hydrocarbon ring are especially alkyl groups having 1 to 3 carbon atoms.

In the cycloaliphatic polyisocyanates, preferably at least one of the n isocyanate groups of formula (I) is bonded to the cycloaliphatic hydrocarbyl radical. For example, in the case of isophorone diisocyanate, an isocyanate group is bonded directly to the 1 position of a 3,5,5-trimethyl-substituted cyclohexane radical, while the second isocyanate group is bonded to the 5 position of the cyclohexane radical via a methylene group. More preferably, in the cycloaliphatic polyisocyanates, all n isocyanate groups of formula (I) are bonded to the cycloaliphatic hydrocarbyl radical. This is the case, for example, in dicyclohexylmethane diisocyanate ($H_{12}$MDI). The term dicyclohexylmethane diisocyanate ($H_{12}$MDI) herein embraces 4,4'-$H_{12}$MDI, 2,4'-$H_{12}$MDI, 2,2'-$H_{12}$MDI, and hydrogenated technical grade diphenylmethane diisocyanate. The latter results from essentially complete hydrogenation of the phenyl radicals of the technical grade MDI.

Typical species of the formula (I) that are preferred in the context of the present invention comprise isophorone diisocyanate (IPDI)-based hydrocarbyl radicals and/or dicyclohexylmethane diisocyanate-based hydrocarbyl radicals in the $R^1$ radical, preferably dicyclohexylmethane diisocyanate-based hydrocarbyl radicals.

The $R^1$ radical comprises at least one aromatic hydrocarbyl radical or at least one cycloaliphatic hydrocarbyl radical, but it may also comprise two or more of these radicals. Preferably, the $R^1$ comprises at least 2 aromatic hydrocarbyl radicals or at least 2 cycloaliphatic hydrocarbyl radicals. More preferably, the $R^1$ radical comprises at least 3 aromatic hydrocarbyl radicals or at least 3 cycloaliphatic hydrocarbyl radicals, and most preferably at least 4 aromatic hydrocarbyl radicals or at least 4 cycloaliphatic hydrocarbyl radicals.

For example, by trimerization of an aromatic diisocyanate, for example a tolylene diisocyanate, it is possible to form an isocyanurate group or iminooxadiazinedione group from three isocyanate groups, to which three tolylene monoisocyanate groups are bonded. Such an $R^1$ radical comprises three alkyl-substituted aromatic hydrocarbyl radicals (i.e. three tolylene radicals) and one isocyanurate group. Three NCO groups are bonded to this $R^1$ radical in turn, with the result that n=3 within the scope of the above formula (I). In the case of corresponding trimerization of diphenylmethane 4,4'-diisocyanate, for example, there are actually 6 aromatic hydrocarbyl radicals incorporated in the $R^1$ radical, in respect of which it is likewise the case that the radical bears one isocyanurate group and that n=3 within the scope of the above formula (I).

In principle, higher oligomers are also obtainable, for example, by addition of further diisocyanate molecules onto the free NCO groups of a trimer, forming products having a higher degree of polymerization. For example, addition of two further diisocyanates can form a further isocyanurate ring, which increases the NCO functionality of the species of the formula (I) by 1 (n=4).

However, it is possible to achieve $R^1$ radicals of higher molecular weight not just by oligomerization, for example a dimerization (uretdione formation) or by the aforementioned possibly even multiple trimerization or by biuret or allophanate formation, but also by adduct formation or what is called prepolymer formation.

Reference is made to NCO adducts when, for example, the diisocyanates usable for preparation of the species of the formula (I) are reacted with compounds, i.e. species having a specific molecular weight, preferably a low molecular weight, that especially bear hydroxyl groups, primary and/or secondary amino groups and/or other groups reactive toward isocyanate groups. Such compounds especially include polyols, for example those having three hydroxyl groups, such as glycerol, trimethylolpropane and hexanetriol, those having four hydroxyl groups such as pentaerythritol, or those having six hydroxyl groups such as dipentaerythritol. The hydroxyl groups of these compounds can react with an isocyanate group of a di- or polyisocyanate to form urethane groups, with formation, in the case of an appropriate isocyanate group excess, of polyisocyanates of formula (I) comprising urethane groups in the $R^1$ radical.

Reference is made to NCO prepolymers when, for example, the di- or polyisocyanates usable for preparation of the species of the formula (I) are reacted with polymeric species, i.e. species having polydispersity, where the polymeric species especially bear hydroxyl groups, primary and/or secondary amino groups and/or other groups reactive toward isocyanate groups. Such polymeric species are, for example, polyester polyols, polyether polyols or polyether polyester polyols. The hydroxyl groups of these polymeric species can react with an isocyanate group of a diisocyanate to form urethane groups, with formation, in the case of an appropriate isocyanate group excess, of polyisocyanates of formula (I) comprising urethane groups in the $R^1$ radical and ether groups or ester groups or ether and ester groups.

In the present invention, a distinction is made hereinafter between hydrophobic blocked polyisocyanates and hydrophilic blocked polyisocyanates. Particular preference is given to the hydrophobic blocked polyisocyanates.

In order to obtain hydrophobic blocked polyisocyanates, all n NCO groups in formula (I) are reacted with blocking agents below, and the $R^1$ radical does not comprise any hydrophilic groups, for example polyethylene oxide radicals, sulfonate groups, sulfate groups and/or carboxylate groups.

In order to obtain hydrophilic blocked polyisocyanates, polyisocyanates of the formula (I) are used
a. which have hydrophilic groups in the $R^1$ radical, for example polyethylene oxide radicals, sulfonate groups, sulfate groups and/or carboxylate groups; and/or
b. in which at least one, preferably exactly one, of the n NCO groups is reacted with one of the hydrophilizing agents below.

The content of the ketoxime- and/or pyrazole-blocked polyisocyanates (B) is preferably chosen such that the ratio of the isocyanate groups in the blocked polyisocyanate(s) (B) to the isocyanate-reactive groups in the isocyanate groups reactive polymer (A) is 0.5 to 2, more preferably 0.75 to 1.8, even more preferably 1 to 1.6 and especially 1.2 to 1.6.

The isocyanate group content of the ketoxime- and/or pyrazole-blocked polyisocyanates (B) is preferably 8% to 22% by weight, more preferably 9% to 21% by weight, most preferably 12% to 20% by weight. The isocyanate group content was determined to DIN ISO 11909:2007.

If the ketoxime- and/or pyrazole-blocked polyisocyanates (B) are hydrophilized species, the isocyanate group content thereof is preferably 8% to 15% by weight, more preferably 9% to 13% by weight, most preferably 9.5% to 12.5% by weight.

If the ketoxime- and/or pyrazole-blocked polyisocyanates (B) are non-hydrophilized, i.e. hydrophobic, species, the isocyanate group content thereof is preferably 10% to 22% by weight, more preferably 12% to 21% by weight, most preferably 13% to 20% by weight.

Blocking Agents

The blocking agents suitable in the context of the present invention are ketoximes and pyrazoles.

The preferred ketoximes of the general formula (II) are obtainable by reaction of hydroxylamine with a ketone according to the following reaction scheme:

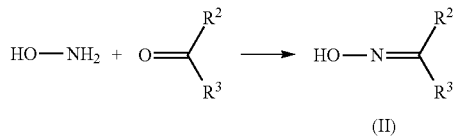

(II)

in which
the $R^2$ and $R^3$ radicals are independently alkyl radicals having 1 to 6, preferably 1 to 4 and more preferably 1 to 3 carbon atoms; or $R^2$ and $R^3$ together form an alkylene radical having 3 to 5 carbon atoms.

More preferably, $R^2$ and $R^3$ are ethyl and/or methyl. Most preferably, $R^2$ is methyl and $R^3$ is ethyl. A corresponding compound of the formula (II) is then referred to as methyl ethyl ketoxime (MEKO) or butanone oxime.

The preferred pyrazoles of the general formula (V)

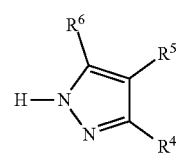

in which
the $R^4$, $R^5$ and $R^6$ radicals are independently hydrogen or an alkyl group having 1 to 6, preferably 1 to 4 and more preferably 1 to 3 carbon atoms may likewise be used as blocking agents in the context of the present invention. Most preferably, the $R^4$, $R^5$ and $R^6$ radicals are methyl and/or ethyl, especially methyl.

The compounds of the formula (V) are more preferably compounds alkyl-substituted, preferably methyl-substituted, at the 3 position of the ring, more preferably with $R^5=R^6=H$, and the compounds of the formula (V) are most preferably compounds alkyl-substituted, preferably methyl-substituted, at the 3 and 5 positions of the ring, most preferably with $R^5=H$. Most preferably, the compound of the general formula (V) is thus 3,5-dimethylpyrazole.

Hydrophilizing Agents

The hydrophilic blocked polyisocyanates are prepared using, as well as the blocking agents that block at least two of the n 3) isocyanate groups of the species of the formula (I), also hydrophilizing agents of the general formula (III)

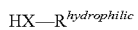

$$HX-R^{hydrophilic} \quad (III)$$

in which
X is O, S, NH or NR' where R' is an alkyl radical having 1 to 8 and preferably 1 to 6 carbon atoms or a cycloalkyl radical having 3 to 8 and preferably 3 to 6 carbon atoms; and $R^{hydrophilic}$ is an alkoxy-terminated polyalkylene oxide radical and/or an organic, preferably aliphatic, radical comprising sulfo groups, sulfonate groups, carboxyl groups and/or carboxylate groups.

The species of the formula (III) are reacted with at least one, preferably just one, of the n≥3) isocyanate groups, in order in this way to introduce at least one, preferably one, hydrophilic group $R^{hydrophilic}$ into the blocked polyisocyanate.

As species of the formula $R^{hydrophilic}$—XH are preferably those in which X is O, NH or NR' and $R^{hydrophilic}$ is a $R^7$—(OEt)$_y$(OPr)$_z$ radical in which $R^7$ is an alkyl radical having 1 to 6, preferably 1 to 4 and more preferably 1 or 2 carbon atoms, y is 4 to 20, preferably 4 to 16 and more preferably 4 to 12, z is 0 to 10, preferably 0 to 6 and more preferably 0 to 4, for example 1 to 4, preferably y+z≤20 and preferably y≥z, more preferably y≥2z, most preferably y≥3z. More preferably, z=0 and y=4 to 20.

Ketoxime-Blocked Polyisocyanates (Species of the Formula (IV))

The following scheme shows, by way of example, the preparation of inventive hydrophobic ketoxime-blocked polyisocyanates (n≥2; q=0; p=n; $R^1$ does not comprise any hydrophilic groups) and hydrophilic ketoxime-blocked polyisocyanates (n≥3; q≥1; p=n−q; and/or n≥2; q≥0; $R^1$ comprises at least one hydrophilic group):

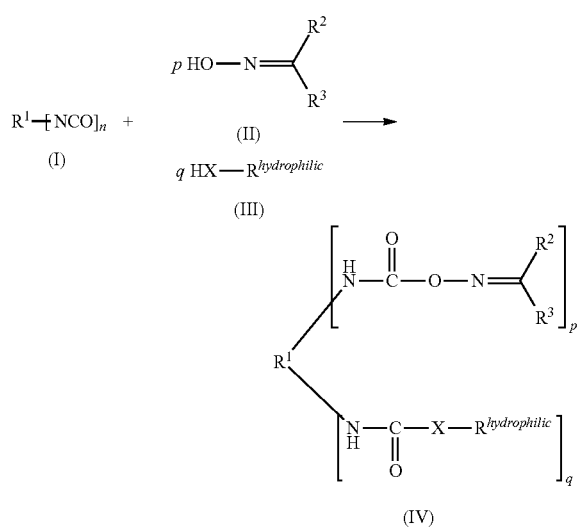

(IV)

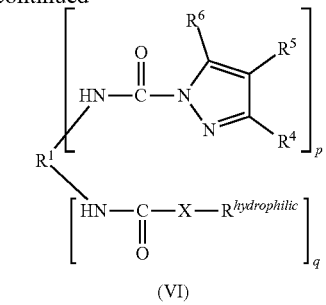

(VI)

in which
R$^1$ is an organic radical free of organic NCO groups and comprising at least one aromatic hydrocarbyl radical or at least one cycloaliphatic hydrocarbyl radical and optionally one or more groups selected from the group of isocyanurate groups, iminooxadiazinedione groups, uretdione groups, allophanate groups, biuret groups, urethane groups, urea groups, ether groups and ester groups;

R$^4$, R$^5$ and R$^6$ are independently hydrogen or alkyl radicals having 1 to 6, preferably 1 to 4 and more preferably 1 to 3 carbon atoms, most preferably methyl and/or ethyl, especially methyl;

R$^{hydrophilic}$ is an alkoxy-terminated polyalkylene oxide radical and/or an organic, preferably aliphatic, radical comprising sulfo groups, sulfonate groups, carboxyl groups and/or carboxylate groups; and n≥2 to preferably 10 and is p+q, where p is 2 to 10 and q is 0 to 8.

Polyanionic Polymer (C)

The aqueous coating composition of the invention comprises at least one polyanionic polymer (C), also referred to hereinafter as polyelectrolyte. In the context of this invention, this is also understood to mean all potentially polyanionic polymers, i.e. including those that bear salt-convertible acid groups, for example an HOOC group, an HOSO$_2$ group or an HOSO$_3$ group.

The polyanionic polymer(s) (C) (also referred to herein as anionic polyelectrolytes (C)) are different than the polymeric polyols (A).

The polyanionic polymers (C) preferably form what are called colloidal solutions in the aqueous medium in which there are no dimensionally stable particles owing to dynamic processes. For this reason too, they should therefore not be confused with the organic polymer particles comprising or consisting of isocyanate-reactive polymers (A) and also should not be included among the constituents of these organic polymer particles (A).

They are selected from the group of (C.i) natural, (C.ii) semisynthetic and (C.iii) synthetic polyanionic polymers. The polyanionic polymers (C) may especially be in partly esterified and/or partly amidated and/or partly epoxidized form.

The group of the (C.i) natural polyanionic polymers includes, for example, naturally occurring anionic polysaccharides, for example anionic polysaccharides comprising glucuronic acid and/or galacturonic acid, especially those selected from the group of the pectins, gum arabic, tragacanth, karaya, gum ghatti, xanthan and gellan; anionic polysaccharides comprising guluronic acid and/or mannuronic acid, such as, in particular, alginates; naturally occurring sulfated and optionally additionally carboxylated polysaccharides, for example agar, carrageenan, chondroitin sulfate, and heparin. Preference is given to polyanionic in which
R$^1$ is an organic radical free of organic NCO groups and comprising at least one aromatic hydrocarbyl radical or at least one cycloaliphatic hydrocarbyl radical and optionally one or more groups selected from the group of isocyanurate groups, iminooxadiazinedione groups, uretdione groups, allophanate groups, biuret groups, urethane groups, urea groups, ether groups and ester groups;

R$^2$ and R$^3$ are independently alkyl radicals having 1 to 6, preferably 1 to 4 and more preferably 1 to 3 carbon atoms; or together form an alkylene radical having 3 to 5 carbon atoms;

R$^{hydrophilic}$ is an alkoxy-terminated polyalkylene oxide radical and/or an organic, preferably aliphatic, radical comprising sulfo groups, sulfonate groups, carboxyl groups and/or carboxylate groups; and n≥2 to preferably 10 and is p+q, where p is 2 to 10 and q is 0 to 8.

More preferably, the R$^1$ radical comprises at least one aromatic hydrocarbyl radical.

More preferably, q is 0, meaning that the polyisocyanates are hydrophobic ketoxime-blocked polyisocyanates.

Pyrazole-Blocked Polyisocyanates (Species of the Formula (VI))

The following scheme shows, by way of example, the preparation of inventive hydrophobic pyrazole-blocked polyisocyanates (n≥2; q=0; p=n; R$^1$ does not comprise any hydrophilic groups) and hydrophilic pyrazole-blocked polyisocyanates (n≥3; q≥1; p=n–q; and/or n 2; q 0; R$^1$ comprises at least one hydrophilic group):

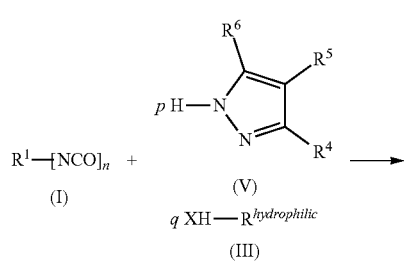

polysaccharides containing carboxyl groups, especially those bearing exclusively carboxyl groups or carboxylate groups. Among these, particular preference is given to pectins, alginates and gellans.

In addition, the group of the (C.i) natural polyanionic polymers include naturally occurring polymers of or comprising acidic amino acids, such as, in particular, polyamino acids and polypeptides. The acidic amino acids especially include those that bear at least one further carboxyl group as well as the obligatory amino group and carboxyl group. The amino acids are linked to one another via what are called peptide bonds, it being immaterial whether these are alpha peptide bonds, omega peptide bonds or isopeptide bonds.

The group of the (C.ii) semisynthetic polyanionic polymers include, for example, subsequently sulfated, phosphated and/or carboxylated natural polyanionic polymers (C.i), for example carboxymethylated polysaccharides. Firstly, the anionic polysaccharides already mentioned under (C.i) may be provided with further anionic groups; secondly, neutral polysaccharides, for example glycogen, amylose, cellulose, starch, dextrans, fructans, callose, curdlan, chitin, polysaccharides formed from tara gum, guar gum and/or locust bean gum, glucomannans and amylopectin or even polysaccharides bearing amino groups, such as chitosan, may be sulfated, phosphated and/or carboxylated.

In addition, the group of the (C.ii) semisynthetic polyanionic polymers also includes, for example, lignosulfates.

The group of the (C.iii) synthetic polyanionic polymers also includes, for example, the polymers that are obtained by a fully synthetic route and are composed of or comprise acidic amino acids such as, in particular, synthetic polyamino acids and synthetic polypeptides.

In addition, the group of the (C.iii) synthetic polyanionic polymers also includes, for example, polyvinylsulfonic acid, polyacrylic acid, polymethacrylic acid and the copolymers of acrylic acid and/or methacrylic acid with acrylic esters, methacrylic esters, acrylamide, styrene, and other acrylic, methacrylic or vinylic monomers.

More preferably, the aqueous coating composition of the invention comprises a mixture of at least two different polyanionic polymers (C), preferably a mixture of two different anionic polysaccharides (C.i), especially a mixture of two pectins.

Preferably, the pectins usable with preference have a degree of esterification of the carboxyl function in the range from 5% to 75% or a degree of substitution (DS) of 1% to 75%, based on a repeat polysaccharide unit.

Preferably, the particularly preferred pectins have a degree of amidation of the carboxyl functions in the range from 1% to 50% and/or a degree of epoxidation of the carboxyl functions of up to 80%, based on a repeat polysaccharide unit.

The polyanionic polymers (C) preferably have a number average molecular weight $M_n$ (determined by means of gel permeation chromatography using pullulan standards and an aqueous 0.05% by weight solution of sodium azide) in the range from 5000 to 500 000 g/mol, preferably 20 000 to 250 000 g/mol and most preferably 25 000 to 150 000 g/mol.

The polyanionic polymer (C) is preferably used in an amount of 0.01% to 5.0% by weight, more preferably in an amount of 0.05% to 2.5% by weight, most preferably in an amount of 0.1% to 1.0% by weight, based on the total weight of the aqueous coating composition.

The polyanionic polymers (C) are preferably used in the form of their ammonium salts and/or phosphonium salts. Among these, particular preference is given to the salts thereof with ammonia and tertiary amines, for example trialkylamines such as, in particular, trimethylamine, triethylamine and tributylamine, or salts thereof with tertiary phosphines, for example trialkylphosphines such as tri-t-butylphosphine or tri-n-butylphosphine or triphenylphosphine. It is likewise possible to use quaternary ammonium salts and phosphonium salts. A preferred quaternary ammonium cation is, for example, tetra-n-butylammonium, and a preferred quaternary phosphonium cation is, for example, tetra-n-butylphosphonium. Likewise usable are salts with DABCO (1,4-diazabicyclo[2.2.2]octane).

Complex Fluorides (D)

The aqueous coating composition of the invention comprises one or more complex fluorides selected from the group consisting of hexa- or tetrafluorides of the metallic elements of groups IVb, Vb and VIb of the PTE, especially of titanium, zirconium or hafnium, preferably in a total amount of $1.1 \cdot 10^{-6}$ mol/l to 0.30 mol/l, based on the metal atom.

The complex fluoride(s) is/are preferably used in a total amount of $1.1 \cdot 10^{-5}$ mol/l to 0.15 mol/l, preferably $1.1 \cdot 10^{-4}$ mol/l to 0.05 mol/l, based on the metal atom.

The inventive addition of complex fluorides leads to largely homogeneous coatings with dry layer thicknesses in the range from typically 20 μm to 100 μm on cold-rolled steel, hot-rolled steel, cast steel, and to dry layer thicknesses of typically >1 μm on galvanized steel sheet or aluminum.

Very particular preference is given to the use of hexafluorozirconic acid and hexafluorotitanic acid and the derivatives thereof.

Aminosilanes (E)

The aqueous coating compositions of the invention preferably comprise at least one aminosilane of the following general formula (VII):

$$H_2N\text{-}L\text{-}Si(OR^7)_{3-i}(R^8)_i \qquad \text{(VII)}$$

in which L is an organic connecting group ("linker");
$R^7$ is an alkyl radical having 1 to 4 carbon atoms, preferably 1 to 3 carbon atoms, more preferably 1 or 2 carbon atoms, especially 2 carbon atoms, or is an O═C—CH$_3$ group;
$R^8$ is an alkyl radical having 1 to 4 carbon atoms, preferably 1 to 3 carbon atoms, more preferably 1 or 2 carbon atoms; and
i is 0 or 1, preferably 0.

Preferably, the organic connecting group L is a divalent hydrocarbyl radical, more preferably a $(CH_2)_k$ radical with k=1, 2 or 3, preferably k=1 or 3.

Preferably, the aminosilanes are present in the aqueous coating composition of the invention in a total amount of 0.0005% to 1.0% by weight, more preferably 0.001% to 0.8% by weight and most preferably 0.0015% to 0.5% by weight. If the total amount of the aminosilanes of the general formula (VII) based on the total weight of the aqueous coating composition of the invention is below 0.0005% by weight, the corrosion resistance of the coating decreases; if the total amount of the aminosilanes of the general formula (VII) exceeds 1.0% by weight, based on the total weight of the aqueous coating composition of the invention, insufficient deposition of the coating composition takes place. More preferably, the upper limit of the total amount of the aminosilanes is 0.2% by weight at most or even just 0.1% or 0.05% by weight, based on the total weight of the aqueous coating composition of the invention. Excellent results are still obtained even well below these amounts.

Additives (F)

More preferably, the aqueous coating composition of the invention comprises at least one additive (F). The additives (F) include only those species that are not covered by any of the definitions of components (A) to (E) or (G).

The additives are preferably selected from the group comprising soluble dyes, pigments, especially carbon black pigments and/or fillers, preservatives, especially biocides, comprising bactericides, fungicides, algicides, herbicides and insecticides; emulsifiers, wetting agents and dispersants, leveling agents, plasticizers, acids for adjusting the pH, thickeners, and crosslinking agents.

Soluble Dye, Pigments and/or Fillers

The aqueous coating compositions of the invention may comprise a wide variety of different dyes, for example soluble dyes and/or very substantially insoluble coloring and/or effect pigments. It is also possible for fillers to be present, which generally differ from the pigments by a diffractive index of less than 1.7. Pigments that are particularly suitable in the context of this invention are carbon black pigments.

Preservatives

The aqueous coating compositions of the invention preferably comprise preservatives or biocides. These include all substances that inhibit the growth of or kill microorganisms (fungi, bacteria, algae), and insecticides and herbicides having growth-inhibiting or killing function, provided that they are not covered by other components of the present invention.

Emulsifiers

Preferably, the aqueous coating composition of the invention comprises at least one emulsifier, more preferably selected from the group of the anionic or nonionic emulsifiers as described above as external emulsifiers in the description of the stabilized organic polymer particles.

Especially in the case of use of (meth)acrylate-terminated polyurethanes as isocyanate-reactive polymer (A), it has been found to be useful to add fatty acid-modified polyesters, preferably those with (terminal) tertiary amino groups, as emulsifiers (available, for example, as EFKA 6225). In this way, it is possible to distinctly increase stabilization in the pH range down to about pH 3.

Wetting Agents and Dispersants

Wetting agents and/or dispersants as usable in the present invention in the coating compositions of the invention serve to wet and disperse pigments and/or fillers. In principle, it is possible to use all wetting agents and/or dispersants in the context of the present invention.

Leveling Agents

Leveling agents help to avoid unwanted surface structures on completion of coating. If the leveling agents are solvents, these are included among the solvents (G).

Acids for pH Adjustment

In principle, the pH of the compositions of the invention can be adjusted by the use of acids such as hexafluorotitanic acid or hexafluorozirconic acid, i.e. complex fluorides (D). In principle, however, it is also possible to use other organic or inorganic acids such as nitric acid or phosphoric acid to adjust the acidic pH.

Crosslinking Agents

In general, the aqueous coating compositions of the invention do not comprise any further external crosslinking agents aside from the ketoxime-blocked and/or pyrazole-blocked polyisocyanates (B). If, however, further crosslinking agents are present, these may be blocked polyisocyanates other than the ketoxime-blocked and/or pyrazole-blocked polyisocyanates (B) and/or amino resins, for example melamine resins.

The addition of amino resins, especially melamine resins, has a positive effect especially in relation to the overcoatability of the coatings obtained by the process of the invention with, for example, basecoats and/or clearcoats.

Solvents (G)

Since the coating compositions of the invention are aqueous compositions, the main solvent is water. The water content of the aqueous coating compositions of the invention is preferably in the range from 65% to 95% by weight, more preferably in the range from 70% to 90% by weight and most preferably in the range from 75% to 85% by weight, based in each case on the total weight of the aqueous coating composition of the invention.

The aqueous coating composition has a pH in the range from 3.0 to 5.0, preferably 3.5 to 4.5 and more preferably in the range from 3.8 to 4.2, especially 3.9 to 4.1. The pH can preferably be adjusted with inorganic acids such as phosphoric acid or nitric acid or the acid form of the complex fluorides (D), for example hexafluorozirconic acid.

As well as water, the aqueous coating compositions of the invention may comprise organic solvents as cosolvent. The content of cosolvents in the aqueous coating compositions of the invention is preferably in the range from 0% to 15% by weight, more preferably in the range from 0% to 10% by weight and most preferably in the range from 0% to 5% by weight, for example 0% to 4% by weight, 0% to 3% by weight or 0% to 2% by weight, based in each case on the total weight of the aqueous coating composition of the invention.

Suitable cosolvents are especially the film-forming aids listed hereinafter, and dialkyl ethers, for example methoxypropanol.

Some specific solvents also act as film-forming aids by softening the surface of the organic polymer particles and hence enabling fusion thereof. In the context of the present invention, this type of film-forming aids is likewise included in the solvents (H).

Especially advantageous film-forming auxiliaries are what are called long-chain alcohols, especially those having 4 to 20 carbon atoms, for example butanediol, butylglycol, butyldiglycol, ethylene glycol ethers such as, in particular, ethylene glycol monobutyl ether, ethylene glycol monoethyl ether, ethylene glycol monomethyl ether, ethylglycol propyl ether, ethylene glycol hexyl ether, diethylene glycol methyl ether, diethylene glycol ethyl ether, diethylene glycol butyl ether, diethylene glycol hexyl ether, or polypropylene glycol ethers such as, in particular, propylene glycol monomethyl ether, dipropylene glycol monomethyl ether, tripropylene glycol monomethyl ether, propylene glycol monobutyl ether, dipropylene glycol monobutyl ether, tripropylene glycol monobutyl ether, propylene glycol monopropyl ether, dipropylene glycol monopropyl ether, tripropylene glycol monopropyl ether, propylene glycol phenyl ether, trimethylpentanediol diisobutyrate, polytetrahydrofurans, polyether polyols and/or polyester polyols.

A film-forming aid likewise commonly used in aqueous primary dispersions is 2,2,4-trimethylpentane-1,3-diol 1-isobutyrate (Texanol®).

Production of the Aqueous Coating Compositions of the Invention

Hydrophobic blocked polyisocyanates (B) can be added, for example, directly in the production process for the anionically and/or nonionically stabilized dispersion of organic polymer particles comprising the isocyanate-reactive polymer (A). The isocyanate-reactive polymer (A) acts here like a protective colloid or external emulsifier for the hydrophobic blocked polyisocyanate (B). After mixing, the two components can be dispersed together.

Hydrophilic blocked polyisocyanates (B) can be blended in a simple manner with the anionically and/or nonionically stabilized dispersion of organic polymer particles comprising the isocyanate-reactive polymer (A).

However, crosslinker dispersions may also be produced from hydrophobic blocked polyisocyanates with the aid of external emulsifiers.

The further constituents are added simultaneously with or subsequent to the above steps, preferably by simple mixing. Then the pH is adjusted.

Preferably, the proportion of organic polymer particles comprising the isocyanate-reactive polymer (A) is such that the molar ratio of NCO groups in the blocked polyisocyanate (B) to the isocyanate-reactive groups in the isocyanate-reactive polymer (A) is 0.5 to 2.0, more preferably 0.75 to 1.8, even more preferably 1 to 1.6, such as, in particular, 1.1 to 1.5 or 1.2 to 1.6. It is thus particularly preferable to use the blocked polyisocyanate (B), with regard to its NCO groups that are reactive at baking temperature, in an excess relative to the isocyanate-reactive groups in the isocyanate-reactive polymer (A).

Preferably, an aqueous coating composition of the invention is produced by
(i) mixing the ketoxime- and/or pyrazole-blocked polyisocyanate(s) (B), with or without use of an external emulsifier, with a dispersion of the organic polymer particles that have an average particle size of 10 to 1000 nm and comprise or consist of one or more isocyanate-reactive polymers (A); or
(ii) preparing a dispersion of the organic polymer particles that have an average particle size of 10 to 1000 nm and comprise or consist of one or more isocyanate-reactive polymers (A) in the presence of the ketoxime- and/or pyrazole-blocked polyisocyanate(s) (B);
and
(iii) simultaneously or subsequently mixing in the polyanionic polymer(s) (C), the complex fluoride(s) (D) and the aminosilane(s) (E); and
(iv) adjusting the pH to a value of 3 to 5.

Process for Coating Metal Ion-Releasing Surfaces of Substrates

The process of the invention for coating the metal ion-releasing surface of a substrate comprises or consists of the steps of:
I. providing a substrate having a metal ion-releasing surface,
II. contacting the metal ion-releasing surface with an aqueous coating composition of the invention to form an organic coating,
III. optionally rinsing the organic coating and
IV. optionally drying the organic coating at a temperature of 10 to 120° C. within a period of 1 to 40 min and curing the organic coating at a peak metal temperature of 120 to 200° C. within a period of 5 to 50 min; or
V. optionally drying the organic coating and coating with a further coating composition of the invention and then drying the coating formed in step V or both coatings and curing the two coatings together at a peak metal temperature of 120 to 200° C. within a period of 5 to 50 min.

Step I
Substrates

Among the substrates having a metal ion-releasing surface to be coated, a distinction is firstly made herein in accordance with the invention between metallic and nonmetallic substrates. In the context of this invention, the metal ions released from the surfaces are metal cations, preferably polyvalent metal cations. The polyvalent metal cations are preferably selected from the group consisting of or comprising $Fe^{2+}$, $Fe^{3+}$, $Al^{3+}$, $Cu^{2+}$, $Zn^{2+}$, $Ca^{2+}$, $Mg^{2+}$, $Ti^{4+}$, $Sn^{2+}$, $Cr^{3+}$ and $Ni^{2+}$.

A metallic substrate refers herein to metals, alloys or substrates coated with a metal or an alloy, where the substrate coated with the metal or alloy is in turn a metal, an alloy or a nonmetallic substrate, for example a plastic, glass or wood. This means that the surface of a substrate is composed of a metal or an alloy. Metallic substrates here must have a surface that releases metal ions under the process conditions, especially at the pH to be observed in the process.

Nonmetallic substrates have a nonmetallic surface, i.e. a surface not consisting of a metal or an alloy, for example an organic and/or nonmetallic inorganic, for example silicatic, coating in which metal ions have been intercalated or through which metal ions released by the underlying substrate can diffuse to the surface.

In order to obtain such a metal ion-releasing nonmetallic substrate with a firmly adhering silicatic coating, coating may be effected, for example, with an aqueous composition in the form of a dispersion based on a colloidal silicatic sol that intercalates polyvalent metal cations or a silane- or silicate-modified polymer.

The nonmetallic inorganic coatings suitable for releasing metal cations from the surface also include, for example, the conversion layers depositable in a pretreatment of metals or alloys.

In principle, all kinds of metallic materials are suitable as substrate, especially those composed of aluminum, iron, copper, titanium, zinc, magnesium, tin and/or alloys having a content of aluminum, iron, calcium, copper, magnesium, nickel, chromium, molybdenum, titanium, zinc and/or tin, where these may also be used adjacently and/or successively. The material surfaces may optionally also be precoated and/or have been precoated as described above, for example with zinc or an aluminum- and/or zinc-containing alloy. A particularly suitable substrate is steel, for example cold-rolled steel or galvanized steel.

Articles to be coated that may be used are in principle all kinds of articles that have metal ion-releasing surfaces. These especially include metal-coated materials or polymeric or fiber-reinforced polymeric materials coated with a metal ion-releasing coating. Particularly preferred articles are especially strips (coils), sheets, parts, for example small parts, joined components, components of complex shape, profiles, rods and/or wires.

Surface Pretreatment

Substrates may be subjected to a surface pretreatment.

The term surface pretreatment in the context of the present invention includes all measures prior to the contacting of the metal ion-releasing surface with an aqueous coating composition of the invention to form an organic coating (step II).

These especially include
the removing of surface impurities (cleaning)
the activating of the surface for the coating and
the applying of corrosion-inhibiting and/or adhesion-promoting layers, especially including metal ion-releasing layers.

The measures for surface pretreatment are guided by the substrate material, any impurities present, by the demands in relation to the choice of cleaning agent, and by the requirements with regard to the coatings to be applied.

The typical impurities in the case of metals or alloys thereof are especially metal turnings, oils, greases, scale, rust, oxides, fly rust, dust, salts, silicones, lapping pastes, paint residues and old coatings. The cleaning can be effected mechanically by, for example, wiping, grinding, polishing, brushing, jetting and thermal flame spraying, or chemically (optionally with mechanical assistance) by pickling and/or cleaning with organic solvents and/or aqueous detergents, especially alkaline detergents. A surface preparation or surface pretreatment can be effected by activating (for example mechanical roughening by jetting or chemical activation with titanium phosphate), deoxidation in the case of aluminum-containing surfaces, conversion coating, for example by chromating or chromate-free methods, and/or post-passivating.

The typical impurities in the case of plastics especially include greases, oils, separating agents, dust and perspiration, especially hand perspiration. The cleaning is typically effected mechanically by rubbing, blowing and/or rinsing and/or chemically by means of organic solvents and/or aqueous detergents. A surface preparation or surface pretreatment can be effected by means of the chrome-sulfuric acid process, satinizing, benzophenone UV treatment, flame treatment, plasma methods and/or corona discharge.

The typical impurities in the case of wood are especially sanding residues and dust. The cleaning is effected mechanically, typically by sanding, polishing and/or brushing. A surface preparation or surface pretreatment can be effected by means of impregnation, sealing and/or priming.

The typical impurities in the case of mineral substrates are especially dust, salts and greases. The cleaning is typically effected mechanically by jetting and/or chemically by means of organic solvents and/or aqueous detergents. A surface preparation or surface pretreatment is typically effected by means of impregnation and sealing.

If the above cleaning steps and preparations or pretreatments still do not give a metal ion-releasing surface, metal ion-releasing organic or inorganic coatings are applied, for example in the form of an already mentioned colloidal silicatic sol that intercalates polyvalent metal cations, or by vapor deposition of a metal or application of what is called an anticorrosion primer comprising metals or metal compounds.

If the above cleaning steps and preparations or pretreatments give a metal ion-releasing surface, no further coating is required. On the other hand, it is possible, for example, to apply coating compositions that themselves release metal ions or are at least permeable to metal ions, such that metal ions in the surface beneath can migrate or diffuse through the coating down to the coating surface.

Step II

The forming of an organic coating in step II. of the coating process of the invention generally proceeds electrolessly. The term electroless coating in the context of this invention means that no external power source is used in the coating of the metal ion-releasing surface with the aqueous coating composition of the invention (external current-free deposition). For example, as well as the apparatus complexity and energy expenditure, it is possible to avoid different layer thicknesses of the coating arising as a result of different local current densities on the substrate, which can lead to an edge buildup. Furthermore, the further disadvantages already outlined above with regard to electrocoating are avoided.

The dip coating step in the process of the invention can be performed within a wide temperature range from preferably 10 to 50° C., more preferably 20 to 40° C., such as, in particular, at room temperature (23° C.).

More preferably, the organic coating is formed in the dip bath within 20 seconds to 20 minutes, most preferably 30 seconds to 3 minutes, such as, in particular, 45 seconds to 2 minutes, and after drying preferably has a dry film thickness in the range from 5 to 50 μm, more preferably 10 to 40 μm and most preferably 15 to 30 μm. The layer thickness increases with dip time and can thus be controlled thereby.

Step III

The optional rinse step III is generally effected with an aqueous medium, for example water or tap water or preferably with a non-demineralized aqueous medium, for example with rinse water from preceding rinse steps. The use of non-demineralized water counteracts redissolution of the coating in the rinse operation.

Steps IV and V

The drying in steps IV and/or V is preferably effected at ambient temperatures between 10 and 100° C., more preferably 20 to 90° C., most preferably 40 to 80° C., over a period of preferably 1 to 30 min, more preferably 2 to 20 min and most preferably 5 to 15 min.

In the case of performance of step V, the procedure may be as in step II. Step V may follow a rinse step analogously to step III.

The curing in steps IV and/or V is preferably effected at temperatures between 130 and 200° C., more preferably of 135 to 190° C., most preferably at "peak metal" temperatures (PMT; object temperature) of 145 to 180° C. and especially 145 to 170° C. over a period of preferably 5 to 45 min, more preferably 10 to 30 min and most preferably 12 to 20 min.

It has been found that the surfaces coated in accordance with the invention were producible in a much simpler and much less expensive manner than, for example, those that are obtained by electrocoating or conventional autophoretic dip coating or powder coating methods and nevertheless have excellent corrosion protection.

It has also been found that such coatings produced in accordance with the invention are essentially equivalent in terms of their properties to the electrocoats and conventional autophoretic dip coatings or powder coatings in modern industrial practice.

It has been determined that, surprisingly, the subsequent coatings deposited in accordance with the invention formed a homogeneous layer with an equal dry layer thicknesses even on a workpiece of complex shape, comparable to the quality of a conventionally electrophoretically or autophoretically deposited paint layer.

The coating of the invention can preferably be used for coated substrates in the form of wire, wire braid, strip, sheet, profile, cladding, part of a vehicle or missile, element for a domestic appliance, element in construction, frame, guardrail element, radiator element or fence element, molding of complicated geometry, or small part, for example screw, nut, flange or spring. It is more preferably used in automobile construction, in the construction sector, for tool manufacture, for domestic appliances or in heating manufacture. The use of the process of the invention is more preferably for coating of substrates that have presented problems in coating with an electrocoat.

The invention is elucidated in detail hereinafter with reference to working examples of the invention and comparative examples.

EXAMPLES

Dip coating baths were filled with aqueous coating compositions according to the constituents specified in tables 1 to 4. The figures in the tables relate to parts by weight (of solids) in 100 parts by weight of the coating composition.

All baths had a pH of 4.0±0.2 and a total solids content of 20.7±0.5% by weight (1 g of sample, 60 min, 125° C.).

At room temperature (23° C.), alkali-cleaned Bonder sheets of cold-rolled steel were dipped into the corresponding baths for 1 min in order to coat the sheets.

Subsequently, the coatings were rinsed with water and dried. The dry layer thickness after drying at 80° C. for 10 minutes was about 20 μm for all samples.

On completion of drying, the sheets coated in accordance with the invention were baked at an object temperature (peak metal temperature; PMT) of 170 or 180° C. for 15 or 20 min.

The samples were tested in the neutral salt spray test (NSS; according to DIN EN ISO 9227:2012-09). Undermining was averaged from multiple measurements in each case and classified into groups from "excellent" (+++) to "poor" (−) (see tables).

The examples identified by an asterisk "*" in the tables are comparative examples.

Constituents of the Examples and Comparative Examples*

A1 Organic polymer particles composed of a hydroxy-functional and hence isocyanate-reactive epoxy resin having an epoxy equivalent weight (VLN 305) of 485-550 g/mol and an average particle size of about 600 nm
B1 DMP-blocked cycloaliphatic polyisocyanate having an NCO content of 14.2% by weight
B2 DMP-blocked cycloaliphatic polyisocyanate having an NCO content of 20.3% by weight
B3 MEKO-blocked cycloaliphatic polyisocyanate having an NCO content of 14.7% by weight
B4 MEKO-blocked aromatic polyisocyanate based on MDI and having an NCO content of 19.0% by weight
B5 DMP-blocked cycloaliphatic polyisocyanate containing a polyethylene oxide chain and having an NCO content of 10.5% by weight
B6 MEKO-blocked cycloaliphatic polyisocyanate containing a polyethylene oxide chain and having an NCO content of 9.7% by weight
C1 pectin (ammonium salt; pH of a 2.5% by weight aqueous solution at 20° C.: 2.5-4.5); having a number-average molecular weight $M_n$ of about 80 000 g/mol
D1 hexafluorozirconic acid
E1 aminopropyltriethoxysilane (AMEO)
F1 preservative The results in table 1 show that it is possible using both hydrophobic and hydrophilic, cycloaliphatic and aromatic, pyrazole- and ketoxime-blocked polyisocyanates to form homogeneous coatings usable for simple applications from aqueous coating compositions that, after predrying at 80° C. for 10 min, show good to acceptable undermining resistance under baking conditions (15 min at 180° C.) at least under brief stress in the neutral salt spray test (168 h). No clear differences exist between hydrophilic and hydrophobic blocked polyisocyanates, and so both types can be employed in principle.

TABLE 1

| Constituents | | | | | | Example 1* | Example 2* | Example 3* | Example 4* | Example 5* | Example 6* |
|---|---|---|---|---|---|---|---|---|---|---|---|
| Organic polymer particles, comprising isocyanate-reactive polymers (A) | | | | | A1 | 13.57 | 15.01 | 13.71 | 14.76 | 12.17 | 11.78 |
| Blocked polyisocyanate (B) | hydrophobic | cycloaliphatic | DMP | 14.2% NCO | B1 | 6.43 | | | | | |
| | | | | 20.3% NCO | B2 | | 4.99 | | | | |
| | | | MEKO | 14.7% NCO | B3 | | | 6.29 | | | |
| | | aromatic | MEKO | 19.0% NCO | B4 | | | | 5.24 | | |
| | hydrophilic | cycloaliphatic | DMP | 10.5% NCO | B5 | | | | | 7.83 | |
| | | | MEKO | 9.7% NCO | B6 | | | | | | 8.22 |
| Polyanionic polymer (C) | | | | | C1 | 0.5 | 0.5 | 0.5 | 0.5 | 0.5 | 0.5 |
| Complex fluorides (D) | | | | | D1 | 0.05 | 0.05 | 0.05 | 0.05 | 0.05 | 0.05 |
| Additive (F) | | | | | F1 | 0.1 | 0.1 | 0.1 | 0.1 | 0.1 | 0.1 |
| Predrying (10 min; 80° C.; on CRS) Baking (15 min; 180° C. (PMT)) Undermining (NSS, 168 h) [mm] | | | | $NCO^{(B)}$/$OH^{(A)}$ ratio = 0.75 | | + | + | + | + | ○ | + |

Under the above drying, baking and test conditions,
undermining [in mm] of 5.0 to 8.5 is rated as "good" (+) and
undermining [in mm] of 8.6 to 12.0 as "acceptable" (○).
The above formulations comprise: 0.9-1.4% by weight of methoxypropanol, 1.6-3.4% by weight of methoxypropyl acetate and 2.9-4.4% by weight of total solvents.
MEKO: methyl ethyl ketoxime;
DMP: 3,5-dimethylpyrazole;
$NCO^{(B)}$: NCO group content in (B) in [mol];
$OH^{(A)}$: OH group content in (A) in [mol]

By comparison with table 1, table 2 shows that good to acceptable undermining results are obtained even at a molar ratio of the blocked NCO groups of the blocked polyisocyanate (B) to the isocyanate-reactive OH groups of the polymer (A) of 1.0.

TABLE 2

| Constituents | | | | | | Example 7* | Example 8* | Example 9* | Example 10* |
|---|---|---|---|---|---|---|---|---|---|
| Organic polymer particles, comprising isocyanate-reactive polymers (A) | | | | | A1 | 12.26 | 13.85 | 12.41 | 13.57 |
| Blocked polyisocyanate | hydrophobic | cycloaliphatic | DMP | 14.2% NCO | B1 | 7.74 | | | |

TABLE 2-continued

| Constituents | | | | | | Example 7* | Example 8* | Example 9* | Example 10* |
|---|---|---|---|---|---|---|---|---|---|
| polyiso- cyanate (B) | phobic | aliphatic aromatic | MEKO MEKO | 20.3% NCO 14.7% NCO 19.0% NCO | B2 B3 B4 | | 6.15 | 7.59 | 6.43 |
| Polyanionic polymer (C) | | | | | C1 | 0.5 | 0.5 | 0.5 | 0.5 |
| Complex fluorides (D) | | | | | D1 | 0.05 | 0.05 | 0.05 | 0.05 |
| Additive (F) | | | | | F1 | 0.1 | 0.1 | 0.1 | 0.1 |
| Predrying (10 min; 80° C.) Baking (15 min; 180° C. (PMT)) Undermining (NSS, 168 h) [mm] | | | NCO$^{(B)}$/OH$^{(A)}$ ratio = 1.0 | | | + | + | ○ | + |

Under the above drying, baking and test conditions,
undermining [in mm] of 5.0 to 8.5 is rated as "good" (+) and
undermining [in mm] of 8.6 to 12.0 as "acceptable" (○).

In table 3, at the same molar ratio of the blocked NCO groups of the blocked polyisocyanate (B) to the isocyanate-reactive OH groups of the polymer (A) of 1.0 as established in table 2, the baking conditions are varied to the effect that the baking operation is effected under underbaking conditions, i.e. at temperatures of 170° C. that typically, i.e. without addition of the silane (E), do not permit complete crosslinking within the given baking period (20 min) for the systems examined. Surprisingly, the inventive coatings of examples 12 and 14 obtained using the silane (E) nevertheless show good to acceptable, and in any case better, undermining results compared to the noninventive coatings of examples 11* and 13*.

TABLE 3

(underbaking conditions)

| Constituents | | | | | | Example 11* | Example 12 | Example 13* | Example 14 |
|---|---|---|---|---|---|---|---|---|---|
| Organic polymer particles, comprising isocyanate-reactive polymers (A) | | | | | A1 | 12.26 | 12.26 | 13.57 | 13.57 |
| Blocked polyisocyanate (B) | hydro- phobic | cycloaliphatic aromatic | DMP MEKO | 14.2% NCO 19.0% NCO | B1 B4 | 7.74 | 7.74 | 6.43 | 6.43 |
| Polyanionic polymer (C) | | | | | C1 | 0.5 | 0.5 | 0.5 | 0.5 |
| Complex fluorides (D) | | | | | D1 | 0.05 | 0.05 | 0.05 | 0.05 |
| Silane (E) | | | | | E1 | 0.0 | 0.002 | 0.0 | 0.002 |
| Additive (F) | | | | | F1 | 0.1 | 0.1 | 0.1 | 0.1 |
| Baking (20 min; 170° C. (PMT)) Undermining (NSS, 240 h) [mm] | | | NCO$^{(B)}$/OH$^{(A)}$ ratio = 1.0 | | | − | ○ | ○ | + |

Under the above drying, baking and test conditions,
undermining [in mm] of 5.0 to 8.5 is rated as "good" (+),
undermining [in mm] of 8.6 to 12.0 as "acceptable" (○) and
undermining [in mm] of greater than 12.0 as "poor" (−).

By comparison with the experiments in table 3, the baking temperature in table 4 was increased again by 10° C. to 180° C. with the same baking time. Predrying was dispensed with. The undermining results after performance of the neutral salt spray test for 240 hours demonstrate that inventive examples 15 and 16 give very good to excellent results in the undermining test. The aqueous coating compositions of the invention are thus distinctly superior to the noninventive compositions even in the case of prolonged exposure in the neutral salt spray test.

TABLE 4

| Constituents | | | | | | Example 15 | Example 16 |
|---|---|---|---|---|---|---|---|
| Organic polymer particles, comprising isocyanate-reactive polymers (A) | | | | | A1 | 13.57 | 10.20 |
| Blocked polyisocyanate (B) | hydrophobic | aromatic | MEKO | 19.0% NCO | B4 | 6.43 | 9.80 |

TABLE 4-continued

| Constituents | | Example 15 | Example 16 |
|---|---|---|---|
| Polyanionic polymer (C) | C1 | 0.5 | 0.5 |
| Complex fluorides (D) | D1 | 0.05 | 0.05 |
| Silane (E) | E1 | 0.002 | 0.002 |
| Additive (F) | F1 | 0.1 | 0.1 |
| Baking (20 min; 180° C. (PMT)) | $NCO^{(B)}/OH^{(A)}$ ratio = 1.0 | ++ | |
| Undermining (NSS, 240 h) [mm] | $NCO^{(B)}/OH^{(A)}$ ratio = 1.5 | | +++ |

Under the above drying, baking and test conditions, undermining [in mm] of less than 2.0 is rated as "excellent" (+++) and undermining [in mm] of 2.1 to less than 5.0 is rated as "very good" (++).

The invention claimed is:

1. An aqueous coating composition comprising
   at least one type of organic polymer particles having a Z-average particle size of 10 to 1000 nm, measured by means of dynamic light scattering, comprising isocyanate-reactive polymers (A),
   one or more ketoxime- and/or pyrazole-blocked polyisocyanates (B), comprising at least one aromatic hydrocarbyl group or at least one cycloaliphatic hydrocarbyl group,
   at least one polyanionic polymer (C),
   at least one complex fluoride (D) selected from the group consisting of hexa- or tetrafluorides of the metallic elements of groups IVb, Vb and VIb of the Periodic Table of the Elements, and
   at least one aminosilane (E) comprising a silyl group of the formula $Si(OR^7)_{3-i}(R^8)_i$ in which $R^7$ is an alkyl group having 1 to 4 carbon atoms or is an O=C—CH₃ group, $R^8$ is an alkyl group having 1 to 4 carbon atoms and i is 0 or 1,
   wherein the aqueous coating composition
   has a pH of 3 to 5, and
   has a total solids content (1 g sample, 60 min, 125° C.) of 5% to 35% by weight.

2. The aqueous coating composition according to claim 1, wherein the ketoxime- and/or pyrazole-blocked polyisocyanate(s) (B) is/are based on tolylene diisocyanate, isophorone diisocyanate, diphenylmethane diisocyanate and/or dicyclohexylmethane diisocyanate.

3. The aqueous coating composition according to claim 1, wherein the ketoxime- and/or pyrazole-blocked polyisocyanate(s) (B) comprise(s) polyethylene oxide chains and/or poly(ethylene oxide-propylene oxide) chains and/or an organic group comprising one or more sulfo groups, sulfonate groups, carboxyl groups and/or carboxylate groups.

4. The aqueous coating composition according to claim 1, wherein the polyanionic polymer (C) is selected from the group consisting of (C.i) naturally occurring anionic polysaccharides, naturally occurring polymers comprising acidic amino acids, (C.ii) semisynthetic polyanionic polysaccharides and lignosulfonates and (C.iii) fully synthetic polyanionic polymers.

5. The aqueous coating composition according to claim 1, wherein the polyanionic polymer (C) is selected from the group consisting of pectins, gellans, alginates and polyacrylic acids.

6. The aqueous coating composition according to claim 1, wherein the complex fluoride(s) (D) is/are selected from the group consisting of hexa- or tetrafluorides of titanium, zirconium or hafnium.

7. The aqueous coating composition according to claim 1, wherein the aminosilane (E) is an aminosilane of the general formula (VII)

$$H_2N\text{-}L\text{-}Si(OR^7)_{3-i}(R^8)_i \qquad (VII)$$

in which L is a divalent organic connecting group;
$R^7$ is an alkyl group having 1 to 4 carbon atoms or is an O=C—CH₃ group;
$R^8$ is an alkyl group having 1 to 4 carbon atoms; and
i is 0 or 1.

8. The aqueous coating composition according to claim 1, wherein
   a content of the organic polymer particles comprising isocyanate-reactive polymers (A) is 3% to 25% by weight, based on a total weight of the aqueous coating composition; and/or
   a content of polyanionic polymers (C) is 0.01% to 5.0% by weight, based on the total weight of the aqueous coating composition; and/or
   an amount of the complex fluorides (D), based on a metal ion therein, is $1.1 \cdot 10^{-6}$ mol to 0.30 mol, in each case per liter of the aqueous coating composition; and/or
   a content of the aminosilanes (E) is 0.0005% to 1.0% by weight, based on the total weight of the aqueous coating composition.

9. The aqueous coating composition according to claim 1, wherein a molar ratio of blocked NCO groups of the ketoxime- and/or pyrazole-blocked polyisocyanates (B) to the isocyanate-reactive groups of the polymers (A) is between 0.5:1 and 2.0:1.

10. The aqueous coating composition according to claim 1, wherein a content of organic solvents is 0% to 15% by weight, based on the total weight of the aqueous coating composition.

11. A process for producing an aqueous coating composition as defined in claim 1, which comprises:
   either
   (i) mixing the ketoxime- and/or pyrazole-blocked polyisocyanate(s) (B), with or without use of an external emulsifier, with a dispersion of the organic polymer particles that have a Z-average particle size of 10 to 1000 nm, measured by means of dynamic light scattering, and comprise one or more isocyanate-reactive polymers (A); or
   (ii) preparing a dispersion of the organic polymer particles that have a Z-average particle size of 10 to 1000 nm, measured by means of dynamic light scattering, and comprise one or more isocyanate-reactive polymers (A) in the presence of the ketoxime- and/or pyrazole-blocked polyisocyanate(s) (B);
   and which further comprises
   (iii) mixing the polyanionic polymer(s) (C), the complex fluoride(s) (D) and the aminosilane(s) (E) into the mixture prepared in step (i) or the dispersion prepared in step (ii), either during or after preparation of the mixture in step (i) or during or after preparation of the dispersion in step (ii); and (iv) subsequently adjusting the pH of the mixture formed in step (iii) to a value of 3 to 5.

12. A process for coating a metal ion-releasing surface of a substrate, comprising the steps of:
  I. providing a substrate having a metal ion-releasing surface,
  II. contacting the metal ion-releasing surface with an aqueous coating composition according to claim 1 to form an organic coating,
  III. optionally rinsing the organic coating and
  IV. optionally drying the organic coating at a temperature of 10 to 120° C. within a period of 1 to 40 min; and curing the organic coating at a peak metal temperature of 120 to 200° C. within a period of 5 to 50 min; or
  V. optionally drying the organic coating and coating with a further aqueous coating composition according to claim 1 and then drying the coating formed in step V or both coatings;
  and curing the two coatings together at a peak metal temperature of 120 to 200° C. within a period of 5 to 50 min.

13. The process for coating a metal ion-releasing surface of a substrate according to claim 12, wherein the substrate is selected from
  a. metallic substrates, comprising metals and/or alloys, and metals and/or alloys and/or nonmetallic substrates that have been coated with metals and/or alloys; and
  b. nonmetallic substrates, comprising an underlying substrate coated with organic coatings and/or nonmetallic inorganic coatings, where metal ions have been incorporated into the coatings or metal ions released by the underlying substrate can diffuse through the coatings to the surface.

14. The process for coating a metal ion-releasing surface of a substrate according to claim 12, wherein said substrate, prior to performance of step II, is subjected to a surface pretreatment comprising one or more of the following measures:
  removing surface impurities;
  activating the surface for the coating in step II; and/or
  applying one or more corrosion-inhibiting and/or adhesion-promoting and/or metal ion-releasing layers.

15. A coating obtainable by the process according to claim 12.

* * * * *